(12) United States Patent
Fornell

(10) Patent No.: US 11,832,736 B2
(45) Date of Patent: Dec. 5, 2023

(54) CRIB PANEL ASSEMBLY SYSTEM

(71) Applicant: HB Innovations, Inc., Los Angeles, CA (US)

(72) Inventor: Peter Fornell, Los Angeles, CA (US)

(73) Assignee: HB Innovations, Inc., Los Angeles, CA (US)

( * ) Notice: Subject to any disclaimer, the term of this patent is extended or adjusted under 35 U.S.C. 154(b) by 95 days.

(21) Appl. No.: 17/487,469

(22) Filed: Sep. 28, 2021

(65) Prior Publication Data

US 2023/0095148 A1 Mar. 30, 2023

(51) Int. Cl.
*A47D 9/00* (2006.01)
*F16B 12/14* (2006.01)
*F16B 12/10* (2006.01)

(52) U.S. Cl.
CPC ............... *A47D 9/00* (2013.01); *F16B 12/14* (2013.01); *F16B 2012/106* (2013.01); *F16B 2012/145* (2013.01)

(58) Field of Classification Search
USPC ............................................................ 5/93.1
See application file for complete search history.

(56) References Cited

U.S. PATENT DOCUMENTS

| 2,518,904 | A | * | 8/1950 | King | ...................... | A47D 7/002 |
| | | | | | | 5/99.1 |
| 3,680,155 | A | | 8/1972 | McMann | | |
| 4,768,243 | A | | 9/1988 | Waples | | |

(Continued)

FOREIGN PATENT DOCUMENTS

| AU | 773924 | | 9/2002 |
| AU | 200129800 | A * | 9/2002 |
| AU | 2004/201376 | | 10/2004 |

OTHER PUBLICATIONS

International Search Report and Written Opinion, PCT/US2022/043673, dated Feb. 1, 2023.

*Primary Examiner* — Justin C Mikowski
*Assistant Examiner* — Adam C Ortiz
(74) *Attorney, Agent, or Firm* — Akerman LLP

(57) ABSTRACT

A crib assembly includes a frame to support a mattress, an enclosure having sides defining an enclosure area, and an attachment system including a first and second attachment mechanisms. A first side of the enclosure has a first end and a second end. The first end is configured to removably attach via the first attachment mechanism to a first corner of the enclosure and the second end is configured to removably attach via the second attachment mechanism to a second corner of the enclosure. The first attachment mechanism includes (a) a first bolt located at the first end of the first side or the first corner of the enclosure and (b) a first slot located at the first end of the first side or the first corner of the enclosure, opposite the first bolt. The second attachment mechanism includes (a) a second bolt located at the second end of the first side or the second corner of the enclosure and (b) a second slot located at the second end of the first side or the second corner of the enclosure, opposite the second bolt. The first and second bolts are dimensioned to be slidably received within the respective first and second slots to removably attach the first and second ends of the first side to the respective first and second corners of the enclosure.

13 Claims, 6 Drawing Sheets

(56) References Cited

U.S. PATENT DOCUMENTS

| | | | |
|---|---|---|---|
| 7,568,244 B1 | | 8/2009 | Shamie et al. |
| 2002/0026668 A1* | | 3/2002 | Aaron .................. A47C 21/046 |
| | | | 5/93.1 |
| 2002/0157182 A1 | | 10/2002 | Guillot |
| 2013/0326809 A1* | | 12/2013 | Jacobs ..................... A47D 7/02 |
| | | | 5/100 |
| 2015/0033473 A1* | | 2/2015 | Wu ...................... A47C 23/155 |
| | | | 5/93.1 |

* cited by examiner

CRIB PANEL ASSEMBLY SYSTEM

TECHNICAL FIELD

The present application relates to an infant crib assembly system, and more particularly a crib system such wherein a crib panel is mounted to crib sides via hidden mounting hardware.

BACKGROUND

Crib panels are currently assembled by inserting screws through the outside of a front or back panel and into a side panel, or by mounting brackets on inside portions of the crib to attach the front or back panel to one of the side panels. These panel assembly systems are visually unappealing due to exposed screws, brackets, or other mounting hardware. The exposed hardware may also endanger an infant occupying the crib by cutting skin or snagging clothing or bedding. The unsightliness of current panel assembly systems also extend to convertible cribs where panels may be subsequently lowered or removed as the child grows to convert the crib into a toddler or day. In these situations, mounting hardware or holes through panel materials may be exposed following conversion of the crib. The instant application discloses a crib assembly system where the mechanisms for attaching the crib's panels together are inaccessible and not visible to the infant.

SUMMARY

In one aspect, a crib assembly includes a frame to support a mattress, an enclosure having sides defining an enclosure area, and an attachment system including a first and second attachment mechanisms. A first side of the enclosure has a first end and a second end. The first end is configured to removably attach via the first attachment mechanism to a first corner of the enclosure and the second end is configured to removably attach via the second attachment mechanism to a second corner of the enclosure. The first attachment mechanism includes (a) a first bolt located at the first end of the first side or the first corner of the enclosure and (b) a first slot located at the first end of the first side or the first corner of the enclosure, opposite the first bolt. The second attachment mechanism includes (a) a second bolt located at the second end of the first side or the second corner of the enclosure and (b) a second slot located at the second end of the first side or the second corner of the enclosure, opposite the second bolt. The first and second bolts are dimensioned to be slidably received within the respective first and second slots to removably attach the first and second ends of the first side to the respective first and second corners of the enclosure.

In one example, the first and second bolts and first and second slots are positioned along upper portions of the first and second ends of the first side and first and second corners of the enclosure.

In an above or another example, the first and second bolts and first and second slots are positioned along lower portions of the first and second ends of the first side and the first and second corners of the enclosure. The first slot may be positioned at the lower portion of the first end of the first side, and the second slot may be positioned at the lower portion of the second end of the first side.

In an above or another example, the first and second bolts comprise shoulder bolts including a head having a larger cross-section dimension than a corresponding cross-section dimension of the shoulder. The first and second slots may comprise key hole slots.

In an above or another example, the crib assembly may include a fixing pin configured to fix the position of the first side of the enclosure when removably attached to the first and second corners of the enclosure. In one configuration, the fixing pin is a screw or a bolt. In one configuration, the fixing pin may extend at least partially into both a lower portion of the first side and the frame. In the an above or another configuration the fixing pin extends at least partially into both the first end or second end of the first side and the corresponding first corner or second corner.

In an above or another example, the crib assembly may include one or more support rods that extend between the first and second slots.

In an above or another example, the attachment system further includes a third and a fourth attachment mechanism that each include respective third and fourth bolts and respective third and fourth slots. The first and second attachment mechanisms may be positioned to removably attach upper portions of the first and second ends of the first side to the respective first and second corners of the enclosure. The third and fourth attachment mechanisms may be positioned to removably attach lower portions of the first and second ends of the first side to the respective first and second corners of the enclosure.

In a further example, the third slot is positioned at the lower portion of the first end of the first side and fourth slot is positioned at the lower portion of the second end of the first side.

In yet a further example, one or more support rods may extend between the third and fourth slots.

In another aspect, a crib assembly includes a frame configured to support a mattress, an attachment system comprising a first attachment mechanism and a second attachment mechanism, and an enclosure having sides defining an enclosure area and extending above the frame. A first side of the enclosure has a first end having an upper portion and a lower portion. The upper portion may be configured to removably attach via the first attachment mechanism to an upper portion of the first corner of the enclosure. The lower portion may be configured to removably attach via the second attachment mechanism to a lower portion of the first corner of the enclosure. The first attachment mechanism may include (a) a first bolt located at the upper portion of the first end of the first side or the upper portion of the first corner of the enclosure and (b) a first slot located at the upper portion of the first end of the first side or the upper portion of the first corner of the enclosure, opposite the first bolt. The second attachment mechanism may include (a) a second bolt located at the lower portion of the second end of the first side or the lower portion of the second corner of the enclosure and (b) a second slot located at the lower portion of the second end of the first side or the lower portion of the second corner of the enclosure, opposite the second bolt. The first and second bolts are dimensioned to be slidably received within the respective first and second slots to removably attach the first end of the first side to the first corner of the enclosure.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

Figure 1:
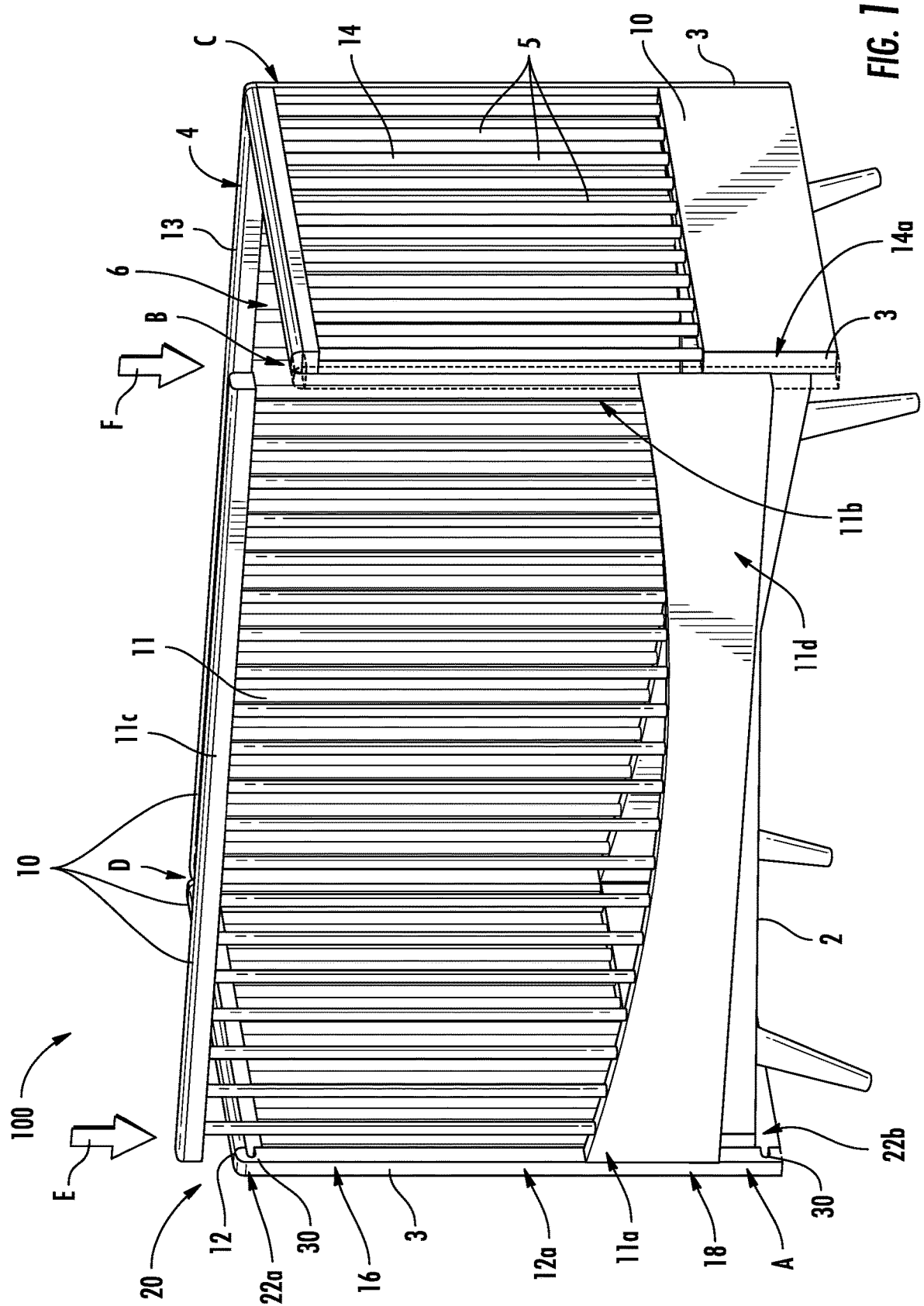
FIG. 1 illustrates one embodiment of the crib assembly including an attachment system according to various embodiments described herein.

The present disclosure describes crib assembly including an attachment system and method for attaching a side of a crib enclosure. The attachment system may be configured to allow a user to easily and securely assemble and disassemble a side of a crib enclosure. The side of the enclosure may include an end configured to interface with a corner of the enclosure to removably attach the side to the enclosure via an attachment mechanism of the attachment system. The attachment mechanism may generally include a bolt that extends from either the end of the side of the enclosure or a corner of the enclosure along an end of an adjacent side of the enclosure to which the side attaches. The attachment mechanism may further include a slot that extends from the end of the side of the enclosure or a corner of the enclosure along an end of an adjacent side of the enclosure that is opposite the bolt. The bolt is dimensioned to slide into the slot and be securely received therein such that it may not be removed if laterally moved against sides of the slot. The slot may further include a closed end to prevent translation of the bolt within the slot beyond the closed end. In some embodiments, the closed end may provide support for the weight of the side. Closed ends of multiple slots may be positioned to correspond with distances between corresponding bolts such that the weight of the side of the enclosure is borne at the closed ends of multiple slots when fully slotted to evenly distribute the weight. Removal of the bolt from the slot typically requires sliding the bolt along the slot to exit the slot along the path in which it was slotted. In some embodiments, a slot may have separate openings that may operate as an exit and an entrance for the bolt to be removed and received. In other embodiments, the slot may have an opening that operates as both an entrance and an exit for slotting the bolt.

In various embodiments, the bolt may include a shoulder that extends distally to a head that includes a larger cross-section dimension than the shoulder. In one example, the slot includes a lip and a channel. The lip may position over the channel and define a smaller cross-section than a corresponding cross-section of the channel. The head of the bolt may have a larger cross-section dimension than a cross-section dimension of the lip of the slot and a cross-section dimension of the shoulder. The cross-section dimension of the channel may be larger than that of the head of the bolt. The cross-section dimension of the lip may be larger than that of the shoulder to allow the shoulder to slide through the slot while the larger cross-section dimension of the head prevents the head from being pulled from the slot when slotted therein.

The attachment system may include any number of attachment mechanisms configured to removably attach any number of sides of the enclosure. The attachment mechanisms may be positioned along upper, middle, and/or lower portions of the sides and corners to which they attach.

FIG. 1 illustrates an exemplary crib assembly 100 having a frame 2 for supporting a mattress (not shown) and an enclosure 4 that positions above the frame 2 and that is configured to extend around the mattress to define a crib enclosure area 6.

The enclosure 4 includes sides 10 that define a crib enclosure area 6 and that are configured to contain a child therein. For specificity of reference with respect to the drawings, the sides 10 may be referred to as first side 11, second side 12, third side 13, and fourth side 14. The sides 10 may also be commonly referred to as side panels. Various configurations of sides 10 may be used. For example, one or more sides 10 may include one or more posts 3, pickets 5, or other structures that extend between upper portions 16 and lower portions 18 of the sides 10. Using the first side 11 for reference, wherein like numbers identify like features with respect to each side 11, 12, 13, 14, the sides 10 may extend between upper rails 11c along upper portions 16, lower rails 11d along lower portions 18, and lateral ends 11a, 11b.

The crib assembly 100 includes an attachment system 20 configured to removably attach one or more sides 10 with respect to the enclosure 4. For brevity and ease of understanding, the present description describes the attachment system 20 with respect to attachment of the first side 11. However, it is to be appreciated that the attachment system 20 and attachment mechanisms 22a, 22b thereof may be employed to removably attach any number of the sides 10 along upper and/or lower portions 16, 18, which may include middle portions, of the sides 10 and/or corners A, B, C, D of the enclosure 4. Similarly, the drawings depict upper and lower attachment mechanisms 22a, 22b for attachment of the first end 11a of the first side 11 to the first corner A along the first end 12a of the second side 12 of the enclosure 4, but the crib assembly 100 may be similarly equipped with corresponding attachment mechanisms 22a, 22b along the second end 11b of the first side 11 and second corner B along first end 14a of the fourth side 14 of the enclosure 4.

As introduced above, the attachment system 20 may include one or more attachment mechanisms 22a, 22b configured to removably attach the first side 11 to an adjacent side 12, 14 of the enclosure 4. For example, the attachment system 20 may include one or more upper attachment mechanisms 22a configured to attach an upper portion 16 of the first side 11 to the first corner A and/or second corner B and/or one or more lower attachment mechanisms 22b configured to attach a lower portion 18 of the first side 11 to the first corner A and/or the second corner B. In the illustrated embodiment, the first side 11 is configured to removably attach between the second and fourth sides 12, 14 via the attachment system 20, wherein ends 11a, 11b of the first side 11 attach along first and second corners A, B along respective first ends 12a, 14a of the second and fourth sides 12, 14. In particular, the upper attachment mechanism 22a (see, e.g., FIGS. 2A-2C) is configured to attach the upper portions 16 of the first end 11a of the first side 11 and the first corner A, and the lower attachment mechanism 22b (see, e.g., FIG. 3) is configured to attach lower portions 18 of the first end 11a of the first side 11 and the first corner A. Although not visible in the drawings, same or similar upper and/or lower attachment mechanisms 22a, 22b may be provided with respect to attachment of the second end 11b of the first side 11 along the second corner B relative to the fourth side 14. In some embodiments, the attachment system 20 may additionally or alternatively include same or similar attachment mechanisms 22a, 22b configured to removably attach the second side 12, third side 13, and/or fourth side 14 with respect to the enclosure 4.

First and/or second corners A, B to which the first side 11 removably attaches via the attachment system 20 may be positioned at first lateral ends 12a, 14a of the respective adjacent second and fourth sides 12, 14. In the illustrated embodiment, the first and second corners A, B comprise corner posts 3 that attach to and form rigid lateral ends 12a, 14a of the second and fourth sides 12, 14. The first and second corners A, B may be integral with the second and fourth sides 12, 14 or may be separate structures attached at ends 12a, 14a of the sides 12, 14 or anchored to the frame 2.

Figure 2A:
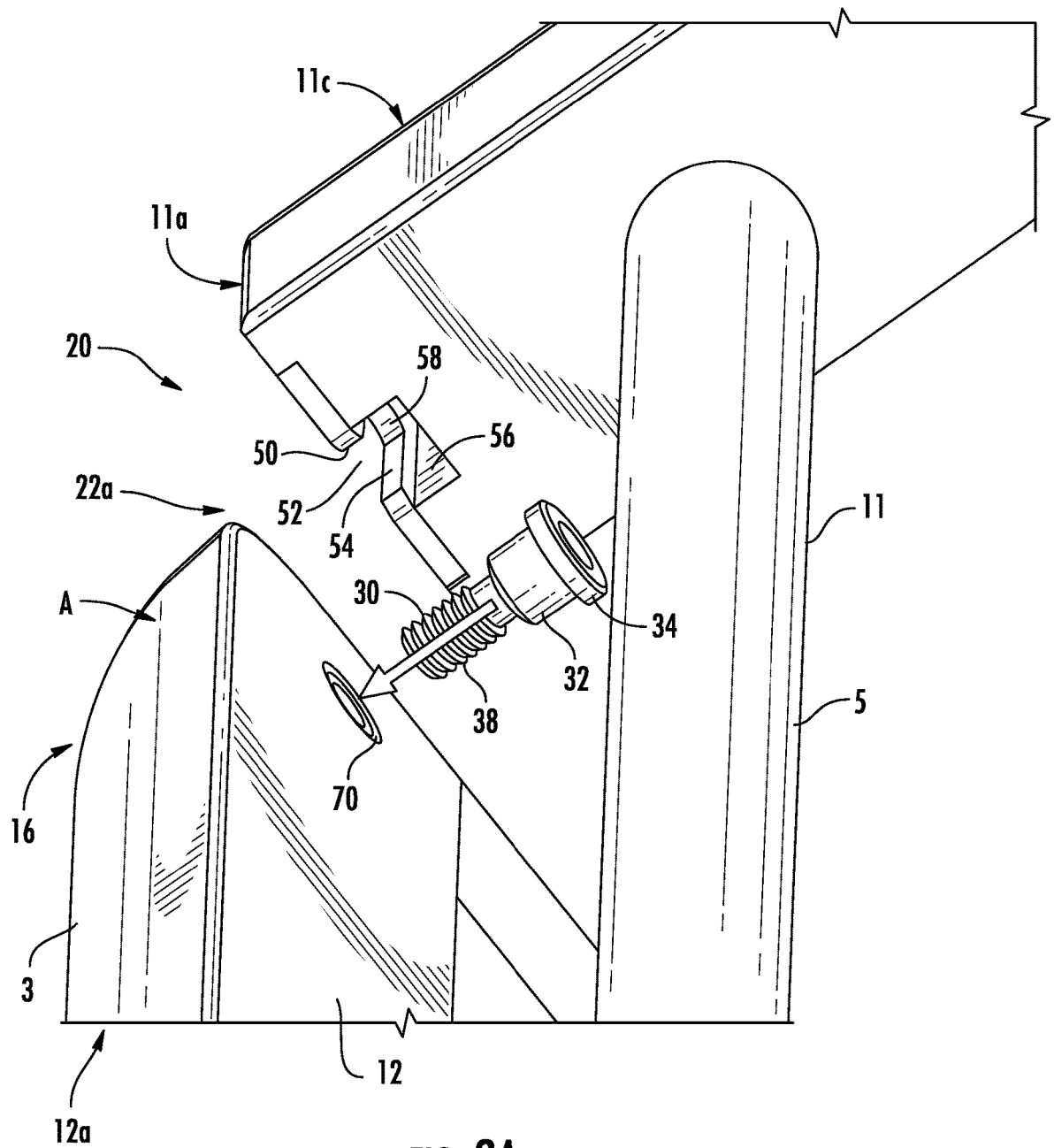
FIG. 2A illustrates an exploded view of the attachment mechanism of the attachment system positioned along upper portions of an end of a side and a corner of an enclosure according to various embodiments described herein.
Figure 2B:
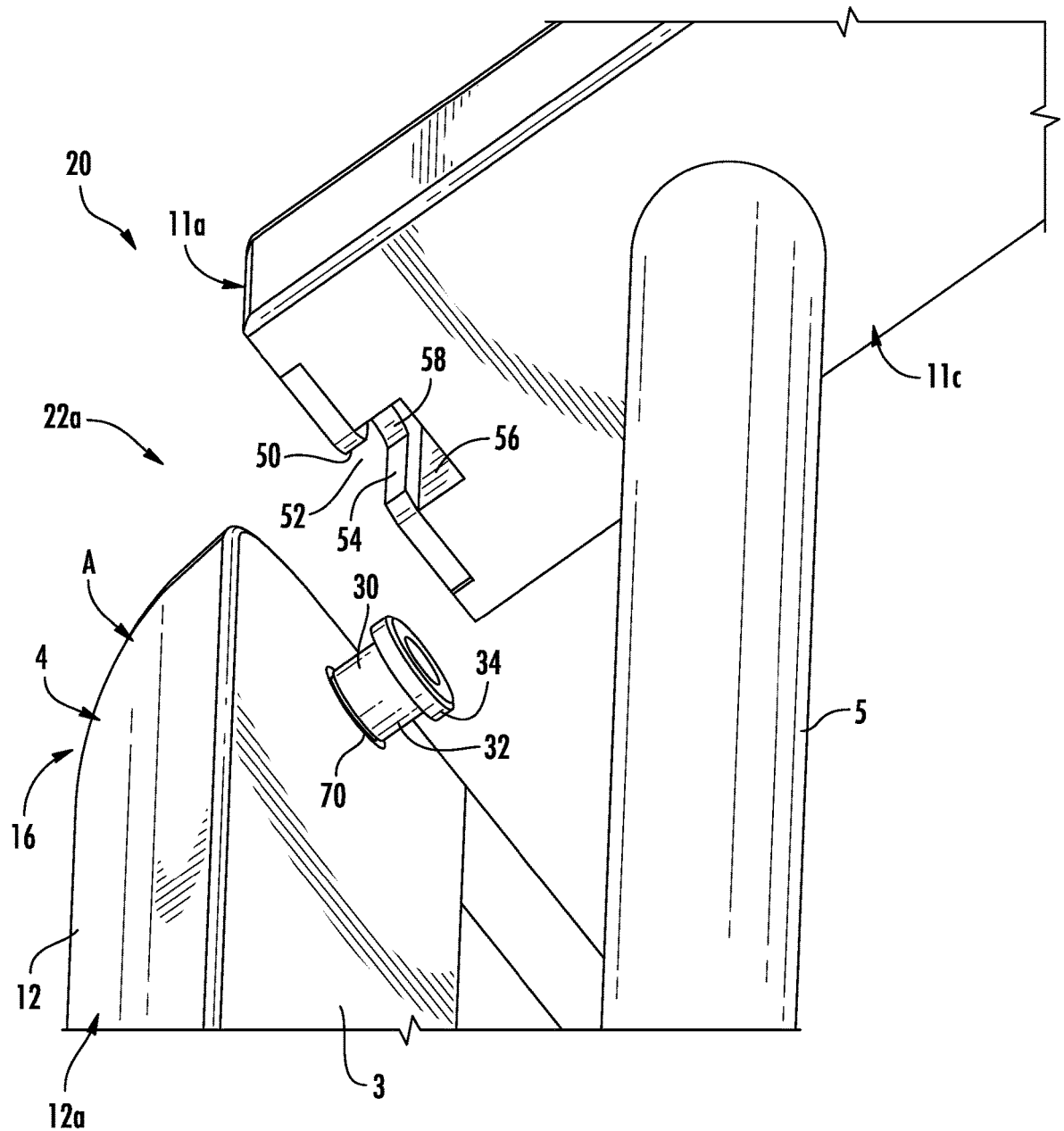
FIG. 2B illustrates the attachment system positioned along upper portions of the end of the side and corner of an enclosure shown in FIG. 2A with the bolt inserted in the corner according to various embodiments described herein.
Figure 2C:
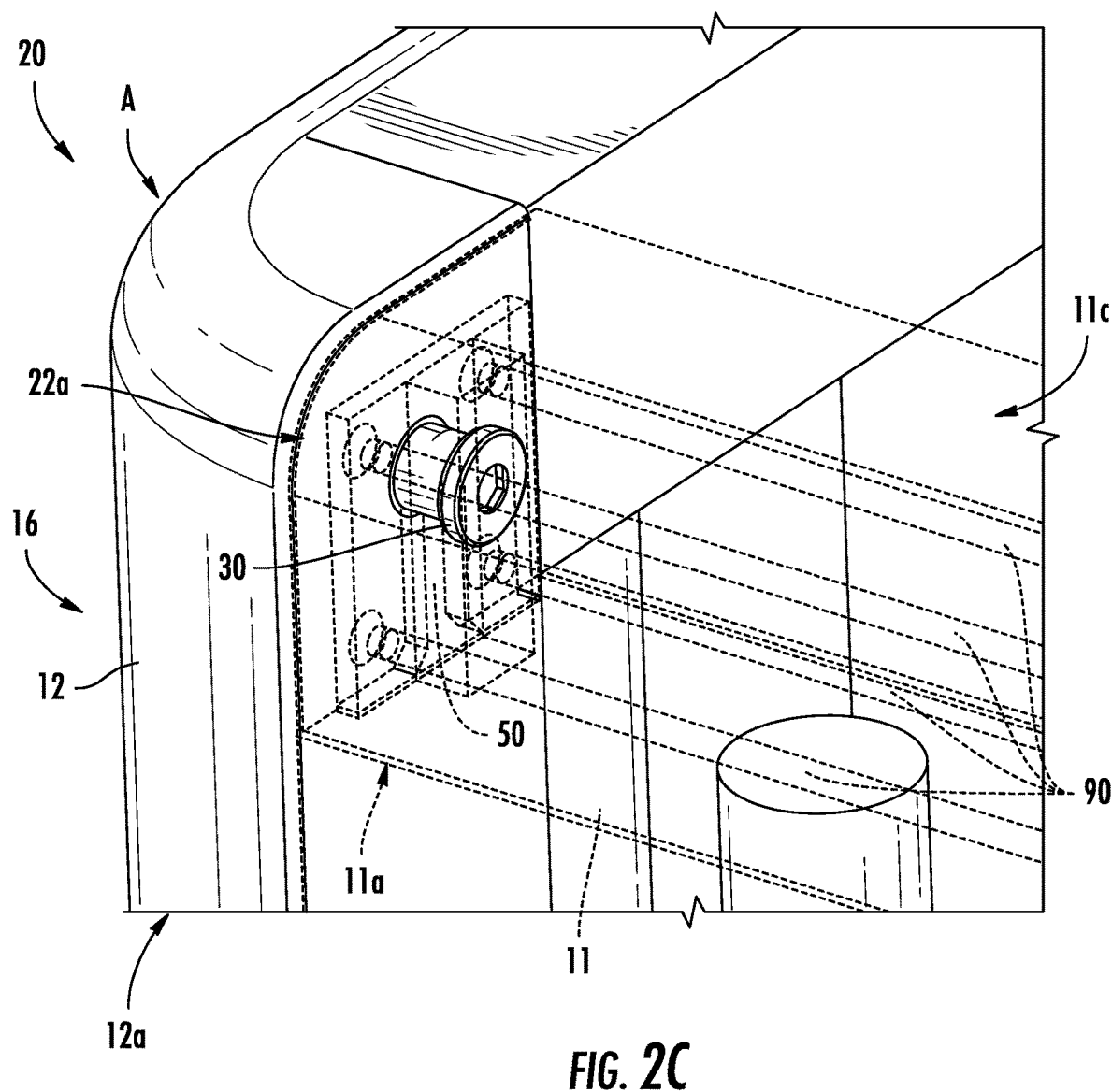
FIG. 2C illustrates a view of the upper portion of the end of the side, in partial ghost, attached to the corner of the enclosure via the attachment mechanism according to various embodiments described herein.
Figure 3:
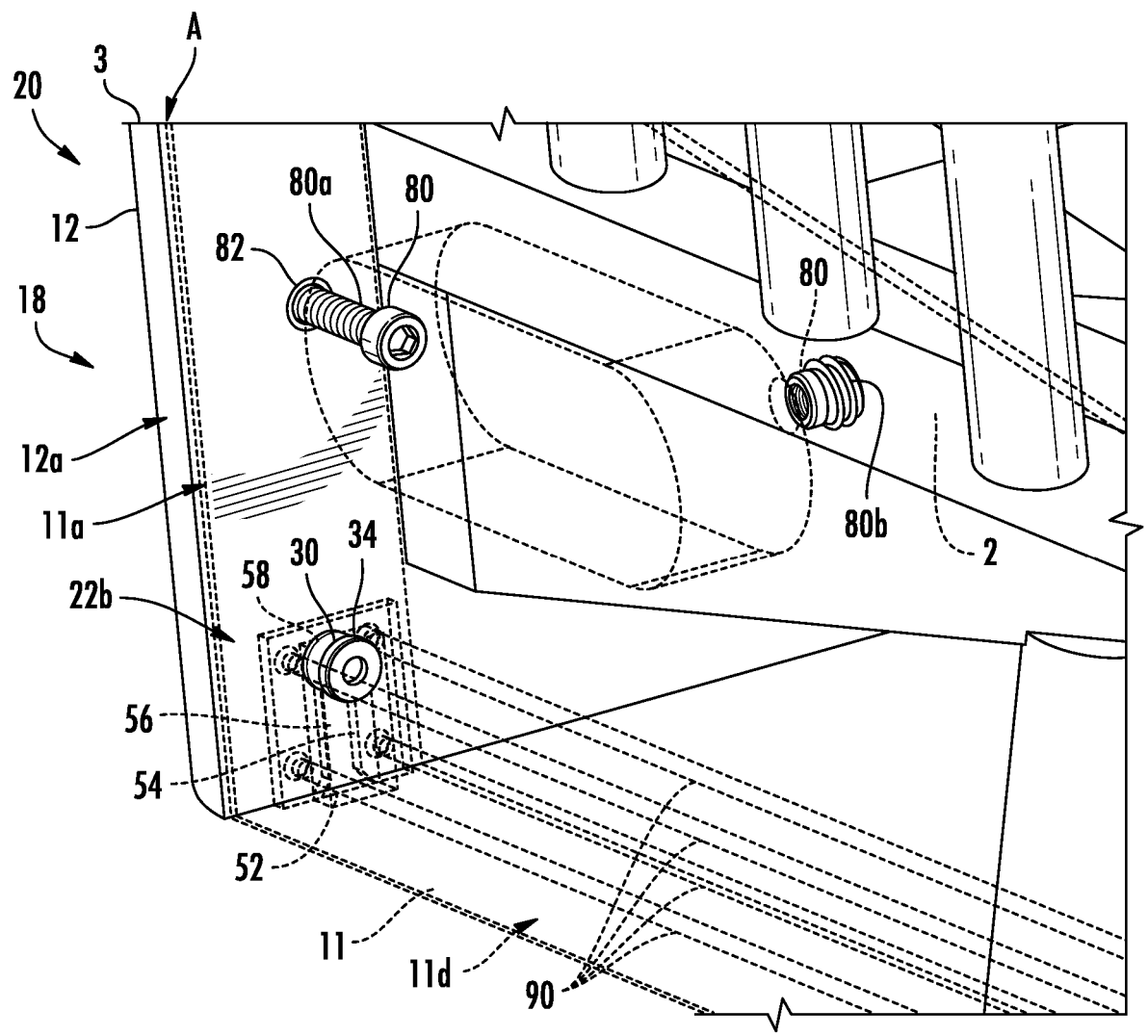
FIG. 3 illustrates an attachment mechanism of an attachment system along lower portions of an end of the side, in partial ghost, and the corner according to various embodiments described herein.

With continued reference to FIG. 2A-FIG. 3, attachment mechanisms 22a, 22b may include a bolt 30 and a slot 50 dimensioned to receive the bolt 30. The bolt 30 may extend from either the first end 11a of the first side 11 or the first corner A. The bolt 30 may be dimensioned to slide into the slot 50 at an opening 52 and be securely received therein such that it may not be removed if laterally moved against sides of the slot 50. Removal of the bolt 30 will typically require sliding the bolt 30 along the slot 50 to exit the slot 50 along the path in which it was inserted. In some embodiments, a slot 50 may have separate openings (not shown) that may operate as a respective exit and a respective entrance for the bolt 30 to be removed and received. In other embodiments, the slot 50 may have an opening 52 that operates as both an entrance and an exit for the bolt 30.

In the illustrated embodiment, the bolt 30 includes a shoulder 32 that extends distally to a head 34. The shoulder 32 may correspond to a shoulder of a traditional shoulder bolt. The head 34 has a larger cross-section dimension than the shoulder 32. The corresponding slot 50 includes lips 54 and a channel 56. The lips 54 extend over and along the channel 56 and define a smaller cross-section than a corresponding cross-section of the channel 56. The head 34 of the bolt 30 has a larger cross-section dimension than the cross-section dimension defined between sides of the lips 54 of the slot 50 and the cross-section dimension of the shoulder 32. The cross-section dimension of the channel 56 is also larger than that of the head 34 of the bolt 30. The cross-section dimension defined between the sides of the lips 54 is larger than that of the shoulder 32 to allow the shoulder 32 to slide through the slot 50 while the larger cross-section dimension of the head 34 prevents the head 34 from being pulled from the slot 50 when slotted therein.

In the illustrated embodiment, the bolts 30 of the upper and lower attachment mechanisms 22a, 22b extend from the respective upper portion 16 and the lower portion 18 of the first corner A. Slots 50 of the upper and lower attachment mechanisms 22a, 22b comprise key hole slots and are located along the corresponding upper portion 16 and lower portion 18 of the first end 11a of the first side 11. The upper and lower attachment mechanisms 22a, 22b are located such that the respective bolts 30 and slots 50 are positioned to interface with each other, wherein the slot 50 is dimensioned to receive the shoulder 32 between the lips 54 at the opening 52 of the slot 50 as the head 34 of the bolt 30 is accommodated within the channel 56. When received at the opening 52, the first side 11 may be manipulated to slot the bolt 30 further into the slot 50 to removably attach the first side 11 to the first corner A.

FIG. 2A provides an exploded view of the upper attachment mechanism 22a configured to removably secure an upper portion 16 of the first side 11 to an upper portion 16 of the first corner A. Specifically, the upper portion 16 of the first corner A includes a threaded insert 70 to accommodate threads 38 of the bolt 30, as illustrated in FIG. 2B. The first end 11a of the first side 11 includes the slot 50 comprising a key hole slot along its upper portion 16. The slot 50 is dimensioned to accommodate the shoulder 32 of the bolt 30 between the lips 54 of the slot 50 and the head 34 within the channel 56 of the slot 50 when the bolt 30 is received within the opening 52 and translated along the slot 50, which may include a closed end 58 to prevent further translation of the bolt 30 within the slot 50, as illustrated in FIG. 2C. In operation, the first side 11 may be removably attached to the enclosure 4 by aligning the bolt 30 with the slot opening 52 and then lowering (see arrows E, F in FIG. 1) the first side 11 to allow the bolt 30 to be fully received within the slot 50 with the interfacing undersides of the lips 54 and head 34 preventing the bolt 30 from being pulled from the slot 50. The head 34 is dimensioned such that the head 34 is secured within the slot 50 of when slotted therein and is removable by sliding the head 34 toward and out from the entrance of the slot 50. For example, to detach the first side 11, a user detaches any fixing pins 80a, 80b, described in more detail below, and lifts the first side 11 to slide the bolt 30 along the slot 50 and out of the opening 52. When attached according to this configuration, the bolt 30 is not visible and is out of reach of an infant occupying the enclosure 4.

With particular reference to FIG. 3, the lower attachment mechanisms 22b may be similar to that described with respect to the upper attachment mechanism 22a. For example, the lower attachment mechanisms 22b may be configured to removably secure a lower portion 18 of the first side 11 to a lower portion 18 of the first corner A. Specifically, the lower attachment mechanisms 22b is positioned along the lower portion 18 of the first end 11a of the first side 11 and includes a slot 50, which comprises a key hole slot in this configuration, and a bolt 30, which comprises a shoulder bolt or screw having a shoulder (not visible in drawing, see shoulder 32 in FIG. 2B) and head 34 as described above with respect to the upper attachment mechanism 22a. The slot 50 is dimensioned to receive the shoulder of the bolt 30 between lips 54 and accommodate the head 34 within the channel 56. The larger diameter of the head 34 guides and prevents the head 34 from being pulled outward from the slot 50. The lower attachment mechanisms 22b removably attaches the first side 11 along the lower portion 18 to the first corner A by aligning the bolt 30 with the slot 50 at the slot opening 52 and then sliding first side 11 downward (indicated by arrows E and F in FIG. 1) such that the bolt 30 translates through the slot 50, which may include a closed end 58 to prevent further translation of the bolt 30. The crib assembly 100 may be equipped with similar upper and lower attachment mechanisms 22a, 22b along upper and lower portions 16, 18 of the second end 11b of the first side 11 and the second corner B.

When the attachment system 20 includes upper and lower attachment mechanisms 22a, 22b along upper and lower portions 16, 18 of the first end 11a, the upper and lower attachment mechanisms 22a, 22b may cooperate to attach the first end 11a of the first side 11 and the first corner A. For example, the first side 11 may be removably attached to the enclosure 4 by aligning the bolts 30 with the slot openings 52 and then lowering the first side 11 to allow the bolts 30 to be fully received within the slots 50 with the interfacing undersides of the lips 54 and head 34 preventing the bolts 30 from being pulled from the respective slots 50. The heads 34 are dimensioned to secure within the slots 50 when slotted therein and are removable by sliding the head 34 through the channel 56 toward and out from the opening 52 of the slots 50. For example, to detach the first side 11, a user detaches any fixing pins 80a, 80b, if present, and lifts the first side 11 to slide the bolts 30 along the respective slots 50 and out of the openings 52.

Figure 4:
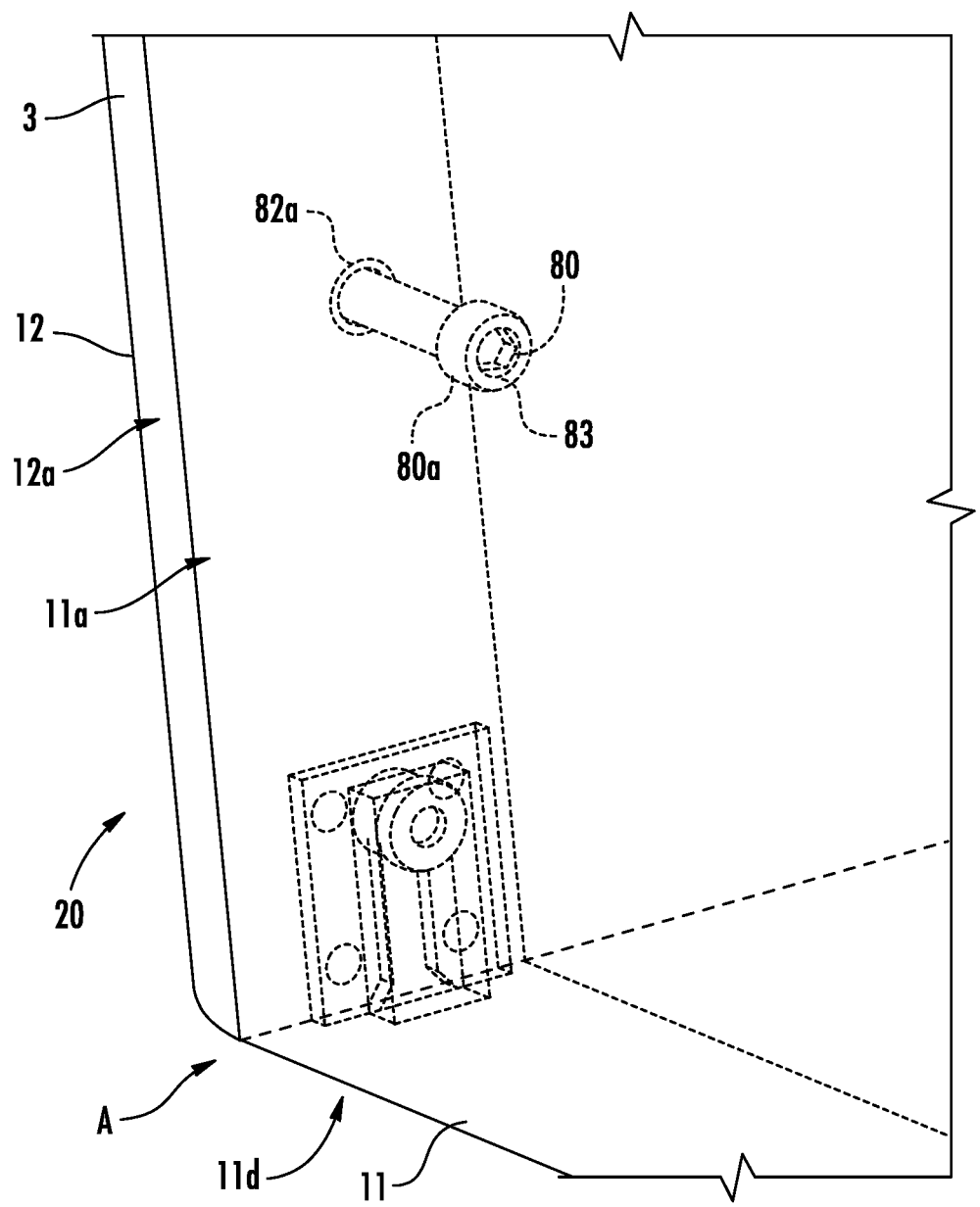
FIG. 4 illustrates a fixing arrangement for fixing ends of adjacent sides of a crib with one side in partial ghost according to various embodiments described here.

In various embodiments, the attachment system 20 may include one or more fixing structures 80 configured to fix the position of the bolts 30 with the slots 50. For example, the fixing structures 80 may include a clamp that clamps a lower rail 11d of the first side 11 relative to the frame 2 or a slot closure arm that latches or otherwise translates above or within the slot 50 to block translation of the bolt 30 from a desired position or from the opening 52 of the slot 50. In some embodiments, fixing structures 80 may comprise one or more fixing pins 80a, 80b that extend at least partially within one of the frame 2, first corner A, or second corner B and at least partially within the first side 11. For example, a bracket attached to the frame 2, first corner A, or second corner B may include a fixing pin 80a, 80b or a hole or opening that may receive a fixing pin 80a, 80b to extend at least partially into a hole or opening in the first side 11, which may include an opening or hole in a bracket attached to the first side 11. Similarly, a bracket attached to the first side 11 may include a fixing pin 80a, 80b or a hole or opening that may receive a fixing pin 80a, 80b to extend at least partially into the frame 2, first corner A, or second corner B. Fixing pins 80a, 80b may also be used without brackets. For example, with reference to FIG. 3, a first fixing pin 80a extends between the first end 11a of the first side 11 and the first corner A, and a second fixing pin 80b extends between the first side 11 and the frame 2. The illustrated fixing pins 80a, 80b are shown as being inserted along the lower portion 18; however, in some embodiments, fixing pins 80a, 80b may be inserted along the upper portion 16 in addition to or instead of along the lower portion 18. The first fixing pin 80a extends through the first end 11a and into the first corner A. An optional threaded insert 82 is used with respect to the first corner A in the illustrated embodiment to improve the connection and longevity of the interface with the first fixing pin 80a. The first fixing pin 80a may also optionally comprise a shoulder bolt or screw. The first fixing pin 80a is positioned within a pocket 84 defined in the first side 11 in order to obscure its view when inserted. In some embodiments, the pocket 84 may include a removable cap or cover to access the head of the first fixing pin 80a to thread the first fixing pin 80a in or out of connection. In one example, the first side 11 includes a removable exterior panel providing a user access to manipulate one or more fixing pins 80a, 80b. Additionally or alternatively, pocket holes may be provided and fixing pins 80a, 80b may include pocket screws, threaded screws, or wood screws. The second fixing pin 80b may extend through the frame 2 and into the lower portion 18 of the first side 11 or vice versa. As depicted, the second fixing pin 80b is threaded through the frame 2 and into the lower portion 18 of the first side 11 from the interior side of the frame 2 or may be threaded from the exterior side or within the pocket 84 of the first side 11 and into the frame 2. Other fixing pin 80a, 80b or fixing structure 80 arrangements may be used. For example, another fixing arrangement is shown in FIG. 4. In this embodiment, a hole 83, which in this example is a pocket hole, extends from the backside of the lower rail 11d and into the first end 12a of the second side 12 at a hole 82a therein, which may be along lower rail 12d, post 3, or other suitable location. In another or further embodiment, a hole, such as a pocket hole, may extend through the first end 12a of the second side 12, which may be along lower rail 12d, post 3, or other suitable location, and into the first end 11a of the first side 11, such as along the lower rail 11d. A fixing pin 80, such as a pocket screw, may be inserted from the second side 12 to fix the adjacent sides 11, 12. A second fixing pin may also be inserted similar to that described with respect to fixing pin 80b in FIG. 3. The above described or illustrated fixing structures 80 may be similarly used to fix the first side 11 at other locations, such as along the second end 11b of the first side 11 or along adjacent ends of the of the thirds side 13 and the second and fourth sides 12, 14. While the fixing pins 80 are illustrated as inserting along ends of adjacent sides, similar connections along upper portions of adjacent sides may also be used in addition to or instead of along the lower portions. The above examples may be employed to hide the holes and hardware once assembled. However, in some embodiments, less aesthetically pleasing configurations can be used where holes and/or fixing pins or other attachment structures, such as brackets or clamps, may be visible following assembly. In another example, fixing pins are not used. In a further example, the slot 50 may include a latch or block that is removably insertable or translatable into the opening 52, lips 54, or channel 56 to prevent the bolt 30 from being translated out of the slot 50 when the latch or block is in place.

Various additional features may be used with the attachment system 20. For example, the slot 50 or first side 11 may include one or more supports to increase stability or durability. In the illustrated embodiment, the first side 11 includes supporting rods 90 that partially or completely traverse the upper and/or lower portions 16, 18 of the first side 11. The rods 90 may improve structural rigidity, durability, and stability of the first side 11, particularly when the side is constructed from a hollow or partially hollow panel or rail 11c, 11d rather than a solid rigid material. In the illustrated embodiment, the upper and lower portions 16, 18 each include four support rods 90 that extend between adjacent slots 50 (only the slots 50 on the first end 11a are shown).

The illustrations of arrangements described herein are intended to provide a general understanding of the structure of various embodiments, and they are not intended to serve as a complete description of all the elements and features of the network architecture, systems, and processes that might make use of the structures described herein. Other arrangements may be utilized and derived therefrom, such that structural and logical substitutions and changes may be made without departing from the scope of this disclosure. For example, some embodiments may include slots having various configurations. In the illustrated embodiments, the slot extends vertically and the opening is positioned to open downwards. In another configuration, the slot extends vertically and the opening is positioned to open upwards. For example, the slot may be positioned on the corner and the bolt may be positioned on the first end and second end. In another configuration, the slot extends horizontally and the opening is positioned to open toward or away from the enclosure area. In a further example, the slot may be angled or arcuate or may include a curve or turn.

As an additional variation, in some embodiments, the attachment system includes pivot pins that pivotably couple the lower portion or upper portion of a side, such as the first side, relative to the adjacent corners. The side may be pivoted on the pins toward the non-pivoting portion (e.g., upper portion or lower portion, as the case may be) to slot the bolt and secure the side with respect to the enclosure area. As noted above, various configurations of slots may be used. For example, the slot opening may be open toward or away from the enclosure area. The slot may be angled or arcuate or may include a curve or turn. In some configurations, pivot pins may correspond to bolts of the attachment mechanisms descried here and may slide through a vertical, horizontal, or angled slot and therein be pivotable to allow the controlled pivoting of the side to ease the ability of a user to engage the bolt at the opposed upper or lower portion with the corresponding slot. Notably, in the illustrated embodiments, the closed ends of the slots are positioned to correspond with the distance between the bolts to engage the shoulders at the closed ends under the weight of the first side, which is then supported on the bolt and slot.

Additional variations may include the shape of the bolts. For example, the bolts shown in the illustrated embodiments are circular; however, other cross-section shapes may be used, such as oval, arcuate, triangular, square, rectangle, polygonal, or other geometric or non-geometric shape. In some embodiments, the closed end of the slot, along the channel or between the lips, corresponds to the cross-section shape of the shoulder or head to provide a tight fit when engaged.

Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. For example, various embodiments of bolts or pivot pins may be attached to extend distally a fixed distance or may be adjustable to change the distance it extends. Bolts or pivot pins may thread or otherwise attach in any suitable manner to a corner or end of a side. In various embodiments, bolts or pivot pins may be spring loaded to spring outward to insert in a corresponding slot. In one example, an adjustment screw may be provided to allow a user to control the outward extension of a bolt or pin. The screw may face interiorly beneath the frame or otherwise be hidden from view from exterior of the enclosure or within the enclosure area.

This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A crib assembly comprising:
a frame configured to support a mattress;
a first attachment mechanism and a second attachment mechanism;
an enclosure having sides defining an enclosure area and extending above the frame,
wherein a first side of the enclosure has a first end configured to removably attach via the first attachment mechanism to a first corner of the enclosure positioned along a first end of a second side of the enclosure, and a second end configured to removably attach via the second attachment mechanism to a second corner of the enclosure that extends along a first end of a third side of the enclosure,
wherein the first attachment mechanism comprises (a) a first bolt located at the first end of the first side or the first corner of the enclosure and (b) a first slot located at the first end of the first side or the first corner of the enclosure, opposite the first bolt,
wherein the second attachment mechanism comprises (a) a second bolt located at the second end of the first side or the second corner of the enclosure and (b) a second slot located at the second end of the first side or the second corner of the enclosure, opposite the second bolt, and
wherein the first and second bolts are dimensioned to be slidably received within the respective first and second slots to removably attach the first and second ends of the first side to the respective first and second corners of the enclosure; and
a fixing pin configured to fix a position of the first side of the enclosure when removably attached to the first and second corners of the enclosure by extending at least partially into both the first end or second end of the first side and the corresponding first corner or second corner.

2. The crib assembly of claim 1, wherein the first and second bolts and first and second slots are positioned along upper portions of the first and second ends of the first side and first and second corners of the enclosure.

3. The crib assembly of claim 1, wherein the first and second bolts and first and second slots are positioned along lower portions of the first and second ends of the first side and the first and second corners of the enclosure.

4. The crib assembly of claim 3, wherein the first slot is positioned at the lower portion of the first end of the first side and the second slot is positioned at the lower portion of the second end of the first side.

5. The crib assembly of claim 1, wherein the first and second bolts comprise shoulder bolts including a head having a larger cross-section dimension than a corresponding cross-section dimension of the shoulder.

6. The crib assembly of claim 5, wherein the first and second slots comprise key hole slots.

7. The crib assembly of claim 1, wherein the fixing pin comprises a screw or a bolt.

8. The crib assembly of claim 1, wherein the fixing pin extends at least partially into both a lower portion of the first side and the frame.

9. The crib assembly of claim 1, wherein one or more support rods extend between the first and second slots.

10. The crib assembly of claim 1, further comprising a third and a fourth attachment mechanism comprising respective third and fourth bolts and respective third and fourth slots, wherein the first and second attachment mechanisms are positioned to removably attach upper portions of the first and second ends of the first side to the respective first and second corners of the enclosure, and the third and fourth attachment mechanisms are positioned to removably attach lower portions of the first and second ends of the first side to the respective first and second corners of the enclosure.

11. The crib assembly of claim 10, wherein the third slot is positioned at the lower portion of the first end of the first side and fourth slot is positioned at the lower portion of the second end of the first side.

12. The crib assembly of claim 11, wherein one or more support rods extend between the third and fourth slots.

13. A crib assembly comprising:
- a frame configured to support a mattress;
- a first attachment mechanism and a second attachment mechanism;
- an enclosure having sides defining an enclosure area and extending above the frame,
  - wherein a first side of the enclosure has a first end having an upper portion and a lower portion, wherein the upper portion is configured to removably attach via the first attachment mechanism to an upper portion of the first corner of the enclosure, wherein the lower portion is configured to removably attach via the second attachment mechanism to a lower portion of the first corner of the enclosure,
  - wherein the first attachment mechanism comprises (a) a first bolt located at the upper portion of the first end of the first side or the upper portion of the first corner of the enclosure and (b) a first slot located at the upper portion of the first end of the first side or the upper portion of the first corner of the enclosure, opposite the first bolt,
  - wherein the second attachment mechanism comprises (a) a second bolt located at the lower portion of the first end of the first side or the lower portion of the first corner of the enclosure and (b) a second slot located at the lower portion of the first end of the first side or the lower portion of the first corner of the enclosure, opposite the second bolt, and
  - wherein the first and second bolts are dimensioned to be slidably received within the respective first and second slots to removably attach the first end of the first side to the first corner of the enclosure; and
- a fixing pin configured to fix a position of the first side of the enclosure when removably attached to the first corner of the enclosure by extending at least partially into both the first end and the first corner.

* * * * *